United States Patent
Aoki et al.

(10) Patent No.: US 8,103,406 B2
(45) Date of Patent: Jan. 24, 2012

(54) VEHICLE CONTROL APPARATUS

(75) Inventors: Takanori Aoki, Nissin (JP); Koji Yamamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 126 days.

(21) Appl. No.: 12/744,835

(22) PCT Filed: Nov. 25, 2008

(86) PCT No.: PCT/IB2008/003207
§ 371 (c)(1),
(2), (4) Date: May 26, 2010

(87) PCT Pub. No.: WO2009/068960
PCT Pub. Date: Jun. 4, 2009

(65) Prior Publication Data
US 2010/0305796 A1    Dec. 2, 2010

(30) Foreign Application Priority Data
Nov. 26, 2007  (JP) ................. 2007-304556

(51) Int. Cl.
*G06F 7/00*  (2006.01)
(52) U.S. Cl. ..................................... 701/36

(58) Field of Classification Search ............ 701/22, 701/36, 53, 69, 70, 78, 79, 83, 103, 104
See application file for complete search history.

(56) References Cited

U.S. PATENT DOCUMENTS
5,491,975 A * 2/1996 Yamashita et al. .......... 60/276

FOREIGN PATENT DOCUMENTS
| EP | 1 819 034 A | 8/2007 |
| JP | 08-294205 A | 11/1996 |
| JP | 2002-281601 A | 9/2002 |
| JP | 2006-254593 A | 9/2006 |
| JP | 2007-159214 A | 6/2007 |
| JP | 2007-306658 A | 11/2007 |
| WO | WO 2005/081395 A | 9/2005 |
| WO | WO 2005/115788 A | 12/2005 |

* cited by examiner

*Primary Examiner* — Kim T Nguyen
(74) *Attorney, Agent, or Firm* — Kenyon & Kenyon LLP

(57) ABSTRACT

A control unit of a vehicle control apparatus includes a module for receiving an ON signal from an eco switch, a module for reducing a step-up upper limit value of a converter from a predetermined normal upper limit value to a restricted upper limit value at a predetermined voltage reduction rate, and a module for determining an accelerator opening based on an accelerator operation performed by a user. When it is determined that the accelerator opening is equal to or greater than a predetermined threshold while the eco switch is ON, the step-up upper limit value of the converter is restored to the normal upper limit value from the restricted upper limit value at a predetermined voltage increase rate.

8 Claims, 3 Drawing Sheets

VEHICLE CONTROL APPARATUS

This is a 371 national phase application of PCT/IB2008/003207 filed 25 Nov. 2008, claiming priority to Japanese Patent Application No. 2007-304556 filed 26 Nov. 2007, the contents of which are incorporated herein by reference.

BACKGROUND OF THE INVENTION

1. Field of the Invention

The present invention relates to a vehicle control apparatus that performs control in accordance with a fuel-efficient travel demand corresponding to a user operation in a vehicle having a wheel driving motor.

2. Description of the Related Art

In recent years, electric vehicles that are good for the environment such as electric automobiles, hybrid automobiles and fuel cell automobiles, have come to attention. To improve environmental friendliness, it is desirable to achieve energy saving such as improvements in fuel economy. To improve the fuel economy, it is sometimes necessary to make slight sacrifices in the operability of the vehicle or the comfort of the interior space by restricting the driving performance or air-conditioning. Since it is preferable for a user (i.e., a driver) to select an energy saving mode through a simple operation, a switch for issuing a fuel-efficient travel demand to a control unit of the vehicle may be provided. This type of switch is sometimes known as "eco mode switch" or simply "eco switch".

For example, Japanese Patent Application Publication No. 2007-159214 (JP-A-2007-159214) describes an electric automobile having an eco switch, in which a step-up operation of a step-up converter is halted when a user turns the eco switch ON, thereby eliminating switching loss in the converter and enabling fuel-efficient travel.

However, if the step-up operation of the converter is suddenly halted when a driver turns the eco switch ON, the motor torque rapidly decreases, which causes the driver to experience an unpleasant sensation as if brakes were slammed on.

Further, although the driver depresses an accelerator to increase the speed of the vehicle during travel with the eco switch ON, the driving performance expected by the driver cannot be received because the step-up operation of the converter remains halted. Therefore, in JP-A-2007-159214, the step-up operation of the converter is resumed when an accelerator opening reaches or exceeds a predetermined threshold. However, if the step-up operation of the converter is suddenly resumed, the motor torque rapidly increases, which causes the driver to experience a strong sensation of the vehicle leaping forward.

Hence, although an improvement in fuel economy is achieved with the electric automobile described in JP-A-2007-159214 by switching the eco switch ON to halt the step-up operation of the converter, the drivability of the automobile cannot be expected when the eco switch is turned ON or when the accelerator is depressed while the eco switch is ON.

SUMMARY OF THE INVENTION

The present invention provides a vehicle control apparatus that prioritizes travel driving performance automatically and improves drivability in accordance with an acceleration request from a driver while an eco switch is ON, as well as a fuel-efficient travel.

A vehicle control apparatus according to one aspect of the present invention is provided with: a converter that steps up an output voltage of a DC power source to generate a motor driving voltage; instructing means for issuing a fuel-efficient travel demand in accordance with a user operation; and a control unit that controls the converter based on a signal from the instructing means. The control unit includes: reception means for receiving the fuel-efficient travel demand; restricting means for reducing a step-up upper limit value of the converter from a predetermined normal upper limit value to a predetermined restricted upper limit value at a first rate when the reception means has received the fuel-efficient travel demand; determining means for determining an accelerator opening based on an accelerator depression of the user; and restoring means for restoring the step-up upper limit value of the converter to the predetermined normal upper limit value by increasing the step-up upper limit value from the predetermined restricted upper limit value at a second rate when it is determined that the accelerator opening is equal to or greater than a first threshold under the fuel-efficient travel demand.

The control unit may further include restoration-canceling means for returning the restored step-up upper limit value of the converter to the restricted upper limit value at the first rate when it is determined that the accelerator opening is less than a second threshold after the step-up upper limit value of the converter has been restored to the normal upper limit value under the fuel-efficient travel demand.

The second threshold may be set lower than the first threshold.

The second threshold may be set identical to the first threshold.

The first rate may be set to a value prioritizing drivability over fuel efficiency performance.

The second rate may be set to a value prioritizing driving performance over drivability.

The second rate may be set larger than the first rate.

The second rate may be set identical to the first rate.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements, and wherein.

DETAILED DESCRIPTION OF EMBODIMENTS

An embodiment of the present invention will be described in detail below with reference to the drawings. In the following description, a motor 24 represents a motor/generator installed in a vehicle, but a motor that simply functions as an electric motor may also be used. A plurality of motors may be installed in the vehicle. Further, a circuit having a secondary battery, a converter, and an inverter is described as a power supply circuit, but a circuit having other elements such as a low voltage DC/DC converter may also be used. Note that voltage values and so on described below are merely examples used for descriptive purposes, and may be modified appropriately in accordance with vehicle specifications and so on.

Figure 1:
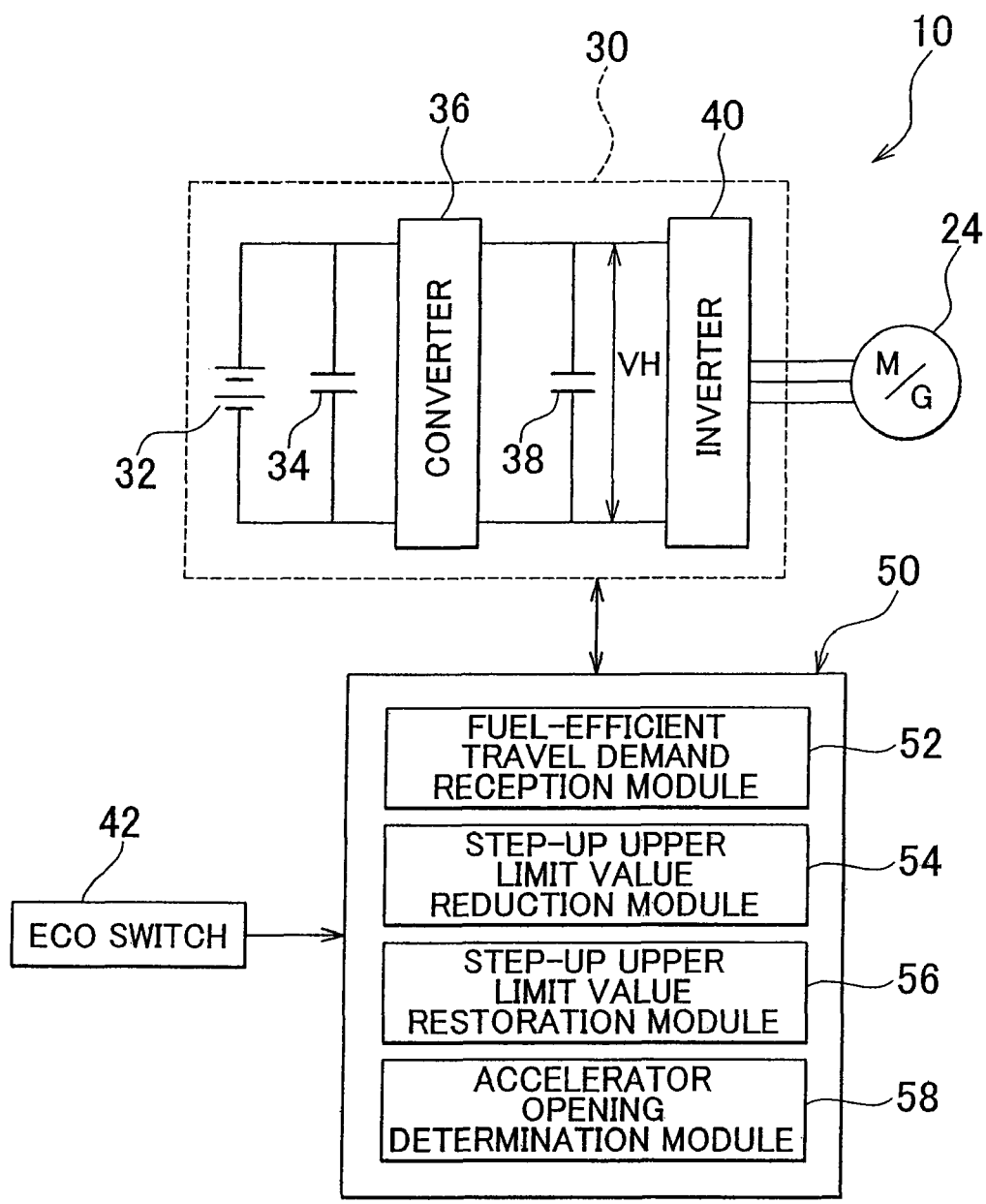
FIG. 1 schematically shows the constitution of a vehicle control apparatus according to an embodiment of the present invention.

FIG. 1 schematically shows the constitution of a vehicle control apparatus 10. The vehicle control apparatus 10 is a system for performing control of a vehicle installed with a wheel driving motor, and here in particular, the vehicle control apparatus 10 has a function for performing control when an eco switch is turned ON and OFF.

The vehicle control apparatus 10 includes a motor 24, a power supply circuit 30 connected to the motor 24, and a control unit 50. Also, an eco switch 42 as instructing means is connected to the control unit 50. The motor 24 is a three-phase synchronous motor which functions as an electric motor when power is supplied thereto for power running, whereas it functions as a generator during regenerative braking.

The power supply circuit 30 is connected to the motor 24. The power supply circuit 30 supplies power to the motor 24 when the motor 24 functions as an electric motor, whereas it receives regenerated power to charge a DC power source when the motor 24 functions as a generator.

The power supply circuit 30 includes a DC power source 32 of a secondary battery, a first smoothing capacitor 34 disposed closer to the DC power source 32, a converter 36 having a step-up/step-down function, a second smoothing capacitor 38 disposed closer to the step-up side, and an inverter circuit 40.

A lithium ion battery pack or a nickel hydrogen battery pack having a terminal voltage of approximately 200 V, for example, may be used as the DC power source 32. Alternatively, a capacitor may be used.

The converter 36 is a circuit capable of stepping up a voltage from the DC power source 32 to a normal upper limit value of approximately 650 V, for example, using an energy storage action of a reactor, and is also known as a "step-up converter". The converter 36 has a bi-directional function, and therefore acts to step-down a high voltage from the inverter circuit 40 to a suitable voltage for the DC power source 32 when power from the inverter circuit 40 is supplied as charging power to the DC power source 32. In FIG. 1, a high voltage output of the converter 36 is denoted as a step-up voltage VH.

The inverter circuit 40 converts high voltage DC power into alternating three-phase drive power, and supplies the alternating three-phase drive power to the motor 24 connected to the inverter circuit 40. Also, the inverter circuit 40 converts alternating three-phase regenerated power from the motor 24 into high voltage DC charging power.

The eco switch 42 is an operation element that a user can operate as desired. When the user turns the eco switch 42 ON, the eco switch 42 outputs a fuel-efficient travel demand signal indicating that the user desires fuel-efficient travel. The eco switch 42 may be provided in an appropriate position on a cockpit console, for example. The state of the eco switch 42, i.e. whether the eco switch 42 is ON or OFF, is transferred to the control unit 50.

The control unit 50 controls operations of the motor 24 installed in the vehicle, through control of the power supply circuit 30. In particular, the control unit 50 performs control to harmonize vehicle drivability, fuel efficiency performance, and so on appropriately through control of the power supply circuit 30 when the eco switch 42 is turned ON and OFF.

The control unit 50 is basically constituted by a central processing unit (CPU), but may include additional elements such as a storage device storing programs and an interface circuit between the eco switch 42 and the control unit 50. When the additional elements are provided in the control unit 50, the additional elements are connected to each other by means of an internal bus. The control unit 50 may be constituted by a computer or the like that is suitable for installation in a vehicle. The control unit 50 may be provided in another computer installed in the vehicle. For example, an electronic control unit (ECU) that performs overall control of the vehicle may also have a function of the control unit 50.

The control unit 50 includes a fuel-efficient travel demand reception module (reception means) 52 that receives an ON signal from the eco switch 42 (i.e., a fuel-efficient travel demand), a step-up upper limit reduction module (restricting means and restoration-canceling means) 54 that reduces a step-up upper limit value of the converter 36 in the power supply circuit 30 from a normal upper limit value to a restricted upper limit value at a predetermined voltage reduction rate when the eco switch 42 is turned ON, a step-up upper limit restoration module (restoring means) 56 that increases the step-up upper limit value of the converter 36 in the power supply circuit 30 from the restricted upper limit value at a predetermined voltage increase rate so as to restore the step-up upper limit value to the normal upper limit value when the eco switch 42 is turned OFF, and an accelerator opening determination module 58 that determines an accelerator opening generated as a result of an accelerator operation performed by a vehicle driver (user). These functions may be realized by executing software, or more specifically by executing an eco switch-related control program within a vehicle control program. A part of these functions may be realized by hardware.

Figure 2:
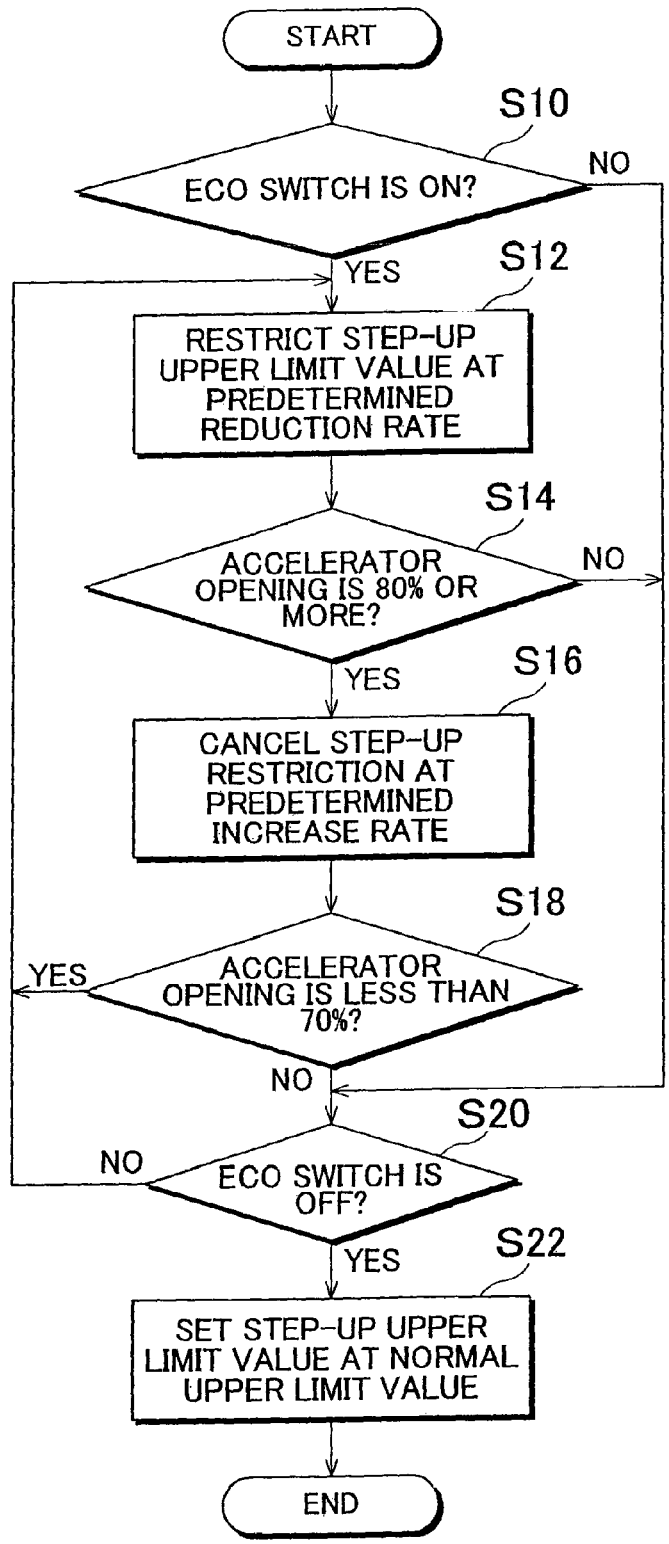
FIG. 2 is a flowchart showing control procedures executed by a control unit of FIG. 1.
Figure 3:
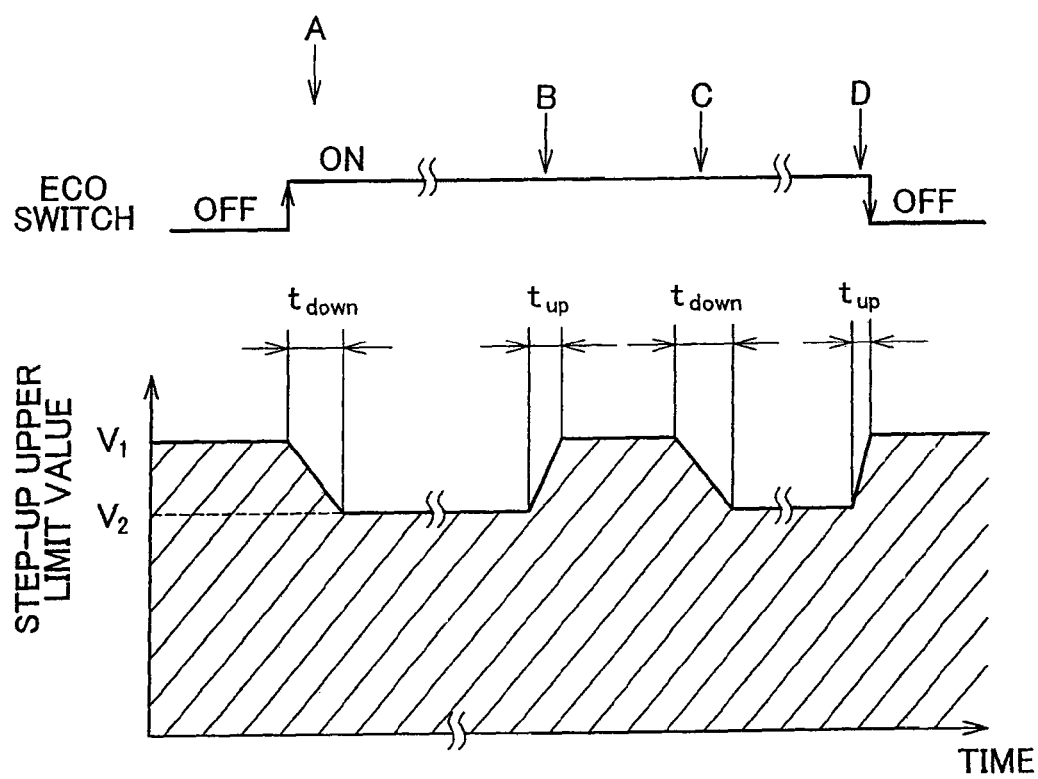
FIG. 3 is a time chart showing an ON/OFF state of an eco switch and variation in a step-up voltage of a converter along a temporal axis during the control shown in FIG. 2.

Next, an operation of the vehicle control apparatus 10 having the constitution described above, and in particular the various functions of the control unit 50, will be described in detail with reference to the flowchart in FIG. 2 and the time chart in FIG. 3. Note that in the following description, the reference numerals of FIG. 1 are used. FIG. 2 is a flowchart showing processing procedures relating to control performed when the eco switch 42 is turned ON and OFF. Each procedure corresponds to a processing procedure of the eco switch-related control program within the vehicle control program. FIG. 3 is a time chart showing temporal variation in the state of the eco switch 42 and the state of the step-up voltage of the converter 36 in the power supply circuit 30 along a common temporal axis, in relation to the flowchart of FIG. 2.

In FIG. 2, during control of a vehicle having the eco switch 42, it is first determined whether the eco switch 42 is ON (step S10). This process is executed by determining in the CPU of the control unit 50 whether the fuel-efficient travel demand reception module 52 has received an ON signal from the eco switch 42.

When the eco switch 42 is ON (YES in the step S10), the step-up upper limit value of the converter 36 in the power supply circuit 30 is reduced at a predetermined voltage reduction rate (step S12). In this case, the step-up upper limit value is reduced from a normal upper limit value, or in other words the step-up upper limit value employed when the eco switch 42 is not ON, to a restricted upper limit value which is determined in advance taking into account the fuel efficiency performance and set to be lower than the normal upper limit value, and in so doing, the step-up upper limit value is restricted. In the above example, the converter 36 steps up approximately 200 V to approximately 650 V, and therefore the normal upper limit value is approximately 650 V. The restricted upper limit value depends on the fuel efficiency performance setting, but may be approximately 500 V, for example.

In FIG. 3, this operation is indicated in the position of an arrow "A". More specifically, when the eco switch 42 is turned ON from OFF, the upper limit value of the step-up voltage is reduced from a normal upper limit value $V_1$ to a restricted upper limit value $V_2$. At this time, the voltage reduction from the normal upper limit value $V_1$ to the restricted upper limit value $V_2$ is executed at a predetermined voltage reduction rate, rather than in a single step. In the example in FIG. 3, the voltage reduction from $V_1$ to $V_2$ is executed comparatively gently over a time period of $t_{down}$. That is, a voltage reduction rate $R_{down} = -(V_1-V_2)/t_{down}$.

The magnitude of the voltage reduction rate $R_{down}$ is set taking into account the drivability in priority to the fuel efficiency performance. When the eco switch is turned ON to restrict the step-up upper limit value of the converter 36, travel is usually either stable or on the way to becoming stable. Therefore, if the voltage reduction rate $R_{down}$ is set to be excessively large taking into account the fuel efficiency performance, the driver experiences a sensation of sudden braking due to a motor torque loss, leading to deterioration of the drivability. Accordingly, the voltage reduction rate $R_{down}$ may be set taking into account the drivability during stable travel, for example.

When the eco switch 42 is not turned ON (NO in the step S10), the routine advances to the processing of a step S20 as described below.

When the eco switch 42 is ON and the step-up upper limit value of the converter 36 has been restricted to approximately 500 V, it is determined by the accelerator opening determination module 58 of the control unit 50 whether the accelerator opening is equal to or greater than 80% (step S14). More specifically, a depressed position (or a pressed position) of an accelerator pedal (or an accelerator lever) is detected by a position sensor, and the accelerator opening is determined based on a resulting detection signal. When the accelerator opening is equal to or greater than 80%, it may be assumed that the driver, i.e. the user, has depressed the accelerator in order to accelerate the vehicle rapidly during fuel-efficient travel while the eco switch 42 is ON.

When the accelerator opening is equal to or greater than 80% (YES in the step S14), the step-up restriction on the converter 36 is canceled (step S16). More specifically, processing is performed to raise the step-up upper limit value of the converter 36 at a predetermined voltage increase rate $R_{up}$ from the restricted upper limit value of approximately 500 V to the normal upper limit value of approximately 650 V.

In FIG. 3, this operation is indicated in the position of an arrow "B". More specifically, when the accelerator opening reaches or exceeds 80% while the eco switch 42 is ON, the upper limit value of the step-up voltage is increased from the restricted upper limit value $V_2$ and restored to the normal upper limit value $V_1$. At this time, the step-up voltage is increased from the restricted upper limit value $V_2$ and restored to the normal upper limit value $V_1$ at the predetermined voltage increase rate $R_{up}$, rather than in a single step. In the example in FIG. 3, the increase from $V_2$ to $V_1$ is executed over a time period of $t_{up}$. That is, the voltage increase rate $R_{up} = +(V_1-V_2)/t_{up}$.

The magnitude of the voltage increase rate $R_{up}$ is set taking into account driving performance in priority to drivability. When the accelerator opening is increased to or above 80% while the eco switch 42 is ON, or in other words during fuel-efficient travel, it may be assumed that the driver wishes to accelerate the vehicle rapidly. Therefore if the voltage increase rate $R_{up}$ is set to be excessively small taking into account the drivability, acceleration may begin too slowly, causing the driver to feel that the acceleration is insufficient. Accordingly, the voltage increase rate $R_{up}$ may be set taking into account the driving performance during acceleration, for example.

Further, the magnitude of the voltage increase rate $R_{up}$, is set larger than that of the voltage reduction rate $R_{down}$. In the above example, $t_{up}$ is set to be shorter than $t_{down}$. Hence, when performing a step-up restriction on the converter 36, the step-up upper limit value is reduced comparatively gently so that the drivability can be improved, and when canceling the step-up restriction on the converter 36, the step-up upper limit value is restored within a short time period so that the driving performance during acceleration, for example can be improved.

When the eco switch 42 is ON and the accelerator opening is less than 80% (NO in the step S14), the routine advances to the processing of the step S20 as described below.

After the processing to cancel the step-up restriction on the converter 36 when the accelerator opening reaches or exceeds 80% has been executed, it is determined whether the accelerator opening is less than 70% (step S18). When the accelerator opening is less than 70%, it may be assumed that the user, having depressed the accelerator pedal greatly to achieve rapid acceleration, returns the accelerator in order to halt the rapid acceleration or decrease the vehicle speed. When the accelerator opening is less than 70%, the routine returns to the step S12, where step-up restriction of the converter 36 is executed again by the step-up upper limit reduction module 54 of the control unit 50. In FIG. 3, this operation is indicated in the position of an arrow "C". At this time, the step-up upper limit value of the converter 36 is reduced from the normal upper limit value to the restricted upper limit value at the voltage reduction rate $R_{down}$, similarly to the operation performed when the eco switch 42 is turned ON.

The reason the accelerator opening threshold of 70% in the step S18 is set lower than the accelerator opening threshold of 80% in the step S14, is as follows. If the two accelerator opening thresholds are set to an identical value, restoration and restriction of the step-up upper limit value of the converter 36 may be performed frequently due to variations of accelerator opening in the vicinity of the threshold, resulting in deterioration of the drivability and fuel economy, on the contrary. However, if the acceleration opening threshold for restricting the step-up upper limit again after canceling the step-up restriction of the converter 36 is set lower, this type of problem may be reduced.

When negative determinations are made in the steps S10 and S14, or the accelerator opening is determined to be equal to or greater than 70% in the step S18, it is determined whether the eco switch 42 has been turned OFF (step S20). When the eco switch 42 is OFF (YES in the step S20), the step-up upper limit value of the converter 36 is set at the normal upper limit value of approximately 650 V, whereupon eco control is ended. As shown by an arrow "D" in FIG. 3, when returning the step-up upper limit value of the converter 36 to the normal upper limit value, the step-up upper limit value is increased comparatively gently at the same voltage increase rate $R_{up}$ as that used to cancel the step-up restriction of the converter 36 during fuel-efficient travel in the step S16.

On the other hand, when the eco switch 42 has not been turned OFF (NO in the step S20), the routine returns to the step S12 as is the case when a positive determination is made in the step S18, and the processing of the steps S12 to S18 is repeatedly executed until the eco switch 42 is turned OFF.

According to the vehicle control apparatus 10 of the embodiment described above, when a fuel-efficient travel demand is received as a result of an operation performed by the user to turn the eco switch ON, the step-up upper limit value of the converter 36 is reduced at the predetermined voltage reduction rate $R_{down}$ from the normal upper limit value of approximately 650 V to the restricted upper limit value of approximately 500 V. Further, when the accelerator opening reaches or exceeds a first threshold of 80% as a result of an accelerator depression of the user while, the fuel-efficient travel demand is received, the step-up upper limit value of the converter 36 is increased from the restricted upper limit value at the predetermined voltage increase rate $R_{up}$ and thereby is restored to the predetermined normal upper limit value. Hence, when a fuel-efficient travel demand is received, the step-up upper limit value of the converter 36 is restricted comparatively gently, rather than rapidly, at the predetermined voltage reduction rate $R_{down}$. As a result, a sensation of sudden braking due to a motor torque loss may be alleviated or suppressed. On the other hand, by automatically canceling the step-up restriction on the converter 36 temporarily in accordance with a user request while the fuel-efficient travel demand is received, a quick response for vehicle acceleration may be realized in accordance with a user's request. In this case also, the step-up upper limit value of the converter 36 is increased to the normal upper limit value comparatively gently, rather than rapidly, at the predetermined voltage increase rate $R_{up}$, and therefore a sensation of the vehicle leaping forward may be alleviated or suppressed. As a result, an improvement in drivability and fuel-efficient travel may be compatible.

Further, according to the vehicle control apparatus 10 of the embodiment, a traveling mode is automatically returned to the fuel-efficient traveling mode when the accelerator opening falls below a second threshold of 70%, and therefore the operation load on the user may be lightened while an improvement in fuel economy may be achieved. At this time, the step-up upper limit value of the converter 36 is returned to the restricted upper limit value from the normal upper limit value at the predetermined voltage reduction rate $R_{down}$, and therefore an unpleasant sensation such as sudden braking due to the motor torque loss may be alleviated or suppressed, resulting in an improvement in drivability.

The voltage increase rate $R_{up}$ and reduction rate $R_{down}$ relating to the step-up upper limit value of the converter 36 are set at different values, and the first and second accelerator opening thresholds of the steps S14 and S18 are set at different values in the vehicle control apparatus 10 according to the embodiment, but it is not excluded from the vehicle control apparatus according to the present invention the voltage increase rate $R_{up}$ and the voltage reduction rate $R_{down}$ may be identical, and the first and second accelerator opening thresholds may be identical.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

The invention claimed is:

1. A vehicle control apparatus, comprising:
a converter that steps up an output voltage of a DC power source to generate a motor driving voltage;
an instructing portion that issues a fuel-efficient travel demand in accordance with a user operation; and
a control unit that controls the converter based on a signal from the instructing portion, wherein the control unit includes:
a reception portion that receives the fuel-efficient travel demand;
a restricting portion that reduces a step-up upper limit value of the converter from a predetermined normal upper limit value to a predetermined restricted upper limit value at a first rate when the reception portion has received the fuel-efficient travel demand;
a determining portion that determines an accelerator opening based on an accelerator depression of the user; and
a restoring portion that restores the step-up upper limit value of the converter to the predetermined normal upper limit value by increasing the step-up upper limit value from the predetermined restricted upper limit value at a second rate when it is determined that the accelerator opening is equal to or greater than a first threshold under the fuel-efficient travel demand.

2. The vehicle control apparatus according to claim 1, wherein the control unit further comprises a restoration-canceling portion that returns the restored step-up upper limit value of the converter to the restricted upper limit value at the first rate when it is determined that the accelerator opening is less than a second threshold after the step-up upper limit value of the converter has been restored to the normal upper limit value under the fuel-efficient travel demand.

3. The vehicle control apparatus according to claim 2, wherein the second threshold is set lower than the first threshold.

4. The vehicle control apparatus according to claim 2, wherein the second threshold is set identical to the first threshold.

5. The vehicle control apparatus according to claim 1, wherein the first rate is set to a value prioritizing drivability over fuel efficiency performance.

6. The vehicle control apparatus according to claim 1, wherein the second rate is set to a value prioritizing driving performance over drivability.

7. The vehicle control apparatus according to claim 1, wherein the second rate is set larger than the first rate.

8. The vehicle control apparatus according to claim 1, wherein the second rate is set identical to the first rate.

* * * * *